United States Patent [19]

Heel et al.

[11] Patent Number: 4,997,325

[45] Date of Patent: Mar. 5, 1991

[54] CHUCK FOR AXIALLY CLAMPING TWO MACHINE PARTS WHICH ARE RELEASABLE FROM EACH OTHER

[75] Inventors: Helmut Heel, Lengenwang; Franz Friedl, Marktoberdorf, both of Fed. Rep. of Germany

[73] Assignee: Ott Maschinentechnik GmbH, Kempten, Fed. Rep. of Germany

[21] Appl. No.: 343,529

[22] Filed: Apr. 26, 1989

[30] Foreign Application Priority Data

Apr. 29, 1988 [DE] Fed. Rep. of Germany ... 8805690[U]

[51] Int. Cl.$^5$ .......................................... B23B 31/171
[52] U.S. Cl. ..................................... 409/233; 279/57; 279/89
[58] Field of Search ................. 409/232-234; 279/1 B, 1 ME, 1 E, 57, 55, 66, 77, 1 F, 1 TS, 93, 89; 82/160; 408/239 P, 240

[56] References Cited

U.S. PATENT DOCUMENTS 4,620,824 11/1986 Eckstein et al. .................... 409/233

FOREIGN PATENT DOCUMENTS

| 292022 | 11/1988 | European Pat. Off. ............... 279/4 |
| 2419896 | 11/1974 | Fed. Rep. of Germany . |
| 3336111 | 2/1985 | Fed. Rep. of Germany ...... 409/232 |
| 3410670 | 10/1985 | Fed. Rep. of Germany . |
| 3512890 | 10/1986 | Fed. Rep. of Germany . |
| 218007 | 1/1985 | German Democratic Rep. .................................... 409/233 |
| 237995 | 8/1986 | German Democratic Rep. .................................... 409/232 |
| 132433 | 8/1983 | Japan .................................. 409/233 |
| 629015 | 9/1978 | U.S.S.R. ............................. 409/233 |

Primary Examiner—Gary Filaumen
Assistant Examiner—Robert Schultz
Attorney, Agent, or Firm—Flynn, Thiel, Boutell & Tanis

[57] ABSTRACT

In a chuck for axially clamping two machine parts which are releasable from each other, on the first machine part (1) are provided a hollow centering attachment (3), a contact face (6) surrounding the attachment, and an annular groove (8) formed on the inside of the attachment (3) and comprising a groove flank (9) tapering conically towards the free end of the attachment. The second machine part (2) comprises a holding bore (4) which is adapted to the attachment (3) and which is surrounded by an end face (7) against which the contact face (6) can be pressed. In the second machine part are provided several clamping jaws (10) which are each supported by a first end (10a) against a groove flank (12) in the second machine part (2). Arranged radially within the clamping jaws (10) and axially movably is a clamping sleeve (15) which comprises in the region of each end (10a, 10b) of the clamping jaws (10) a clamping cone (17, 18) by means of which the clamping jaws (10) are movable radially outwards parallel to themselves and their ends (10a, 10b) can be pressed against the associated groove flanks (9, 12). The clamping jaws (10) comprise at both their ends (10a, 10b) clamping surfaces (11, 14) whose angular position relative to the central axis (A) is adapted to the groove flanks (9, 12), so that during the whole clamping process there is surface contact between the clamping surfaces (11, 14) and the groove flanks (9, 12).

12 Claims, 2 Drawing Sheets

CHUCK FOR AXIALLY CLAMPING TWO MACHINE PARTS WHICH ARE RELEASABLE FROM EACH OTHER

FIELD OF THE INVENTION

The invention concerns a chuck for axially clamping two machine parts which are releasable from each other, in particular for clamping a tool portion in a tool, holding fixture, with a conical or cylindrical hollow, centering attachment provided on the first machine part (tool), a contact face surrounding the attachment and extending perpendicularly to the central axis of the chuck, and an annular groove provided on the inside of the attachment and comprising a groove flank tapering conically towards the free end of the attachment, with a holding bore which is provided in the second machine part (tool holding fixture) and adapted to the attachment and which is surrounded by an end face which extends perpendicularly to the central axis and against which the contact face can be pressed, with several clamping jaws which are arranged essentially parallel to the central axis in the second machine part and which are each supported by a first end against a groove flank of an annular groove provided in the second machine part, and a clamping sleeve which is axially movable in the second machine part and arranged radially within the clamping jaws and which comprises in the region of the second ends of the clamping jaws a clamping cone by means of which the second ends of the clamping jaws are movable radially outwards and can be pressed against the groove flank of the attachment.

BACKGROUND OF THE INVENTION

In a known chuck of this kind (discourse by the firm Gottlieb Gühring KG, 7480 Sigmaringen, on the occasion of a meeting of the "Machine/Tool Interface" working party on 22.5.1987 in Frankfurt, at the Association of German Mechanical Engineering Institutes), the clamping jaws are designed as rockers, which is associated with certain drawbacks. When, during clamping, the second ends of the clamping jaws are forced outwards by the clamping cone, the hooked first ends of the clamping jaws are supported against the annular groove in the second machine part. But as the clamping jaws perform a tilting movement, there is only linear contact between the first ends and the groove flank against which they are supported. Similarly, the second ends abut against the groove flank of the attachment with linear contact. As a result of this linear contact, there is high contact pressure which is associated with correspondingly high wear. Furthermore the axial stroke which the second ends of the clamping jaws perform during their tilting movement is relatively small. Consequently, the cooperating machine parts may have only very low tolerances in an axial direction, in particular the groove flank in the attachment opposite the contact face thereof and the groove flank in the second machine part opposite the end face thereof. Also, the clamping jaws are subject to bending stress during their tilting movement and must accordingly have a correspondingly large cross-section. Consequently, the known chuck has larger structural dimensions in the radial direction and requires a correspondingly large diameter of the attachment on the first machine part.

It is therefore the object of the invention to provide a chuck for axially clamping two machine parts which are releasable from each other, in particular for clamping a tool portion in a tool holding fixture, of the kind mentioned hereinbefore, in which during the whole clamping process surface contact is constantly ensured between the cooperating surfaces of the clamping jaws and the groove flanks in both machine parts, which has smaller structural dimensions in a radial direction and in which greater tolerances are permissible for the cooperating machine parts in an axial direction.

According to the invention, this is achieved by the fact that in the region of the first ends of the clamping jaws, an additional clamping cone acting on these ends is provided at the clamping sleeve so that during axial movement of the clamping sleeve the clamping jaws are movable radially outwards or inwards parallel to themselves, and the clamping jaws comprise at both their ends clamping surfaces whose angular position relative to the central axis is adapted to the groove flanks, so that during the whole clamping process there is surface contact between the clamping surfaces and the groove flanks.

Due to the surface contact during the whole clamping process, there is a lower contact pressure and hence also less wear between the cooperating surfaces. At the same time, due to the lower contact pressure there is also greater rigidity. During the clamping process, the clamping jaws are displaced radially outwards parallel to themselves and no longer, as before, tilted. In this case, only a tensile stress and no bending stress is produced in the clamping jaws. The clamping jaws may consequently have a smaller cross-section, whereby the whole chuck can be built smaller in diameter. Moreover the cooperating machine parts can have greater tolerances in the axial direction. This is due to the fact that the clamping surfaces at the ends of the clamping jaws and the groove flanks during outward movement of the clamping jaws act as wedge surfaces and cause a correspondingly large axial movement between the machine parts. At the same time, greater axial contact pressures are caused between the contact face and the end face, and hence greater rigidity is obtained between the machine parts clamped together. The angles at which the clamping surfaces and the groove flanks are inclined to the bore axis or shaft axis can be varied, in order thus to change the ratio of the radial force exerted by the clamping jaws, to the axial force, and to adapt it to the respective conditions.

Further advantageous developments of the invention are characterised in the subsidiary claims.

BRIEF DESCRIPTION OF THE DRAWINGS

The invention is explained in more detail below with reference to a practical example shown in the drawings in which.

DETAILED DESCRIPTION

Figure 1:
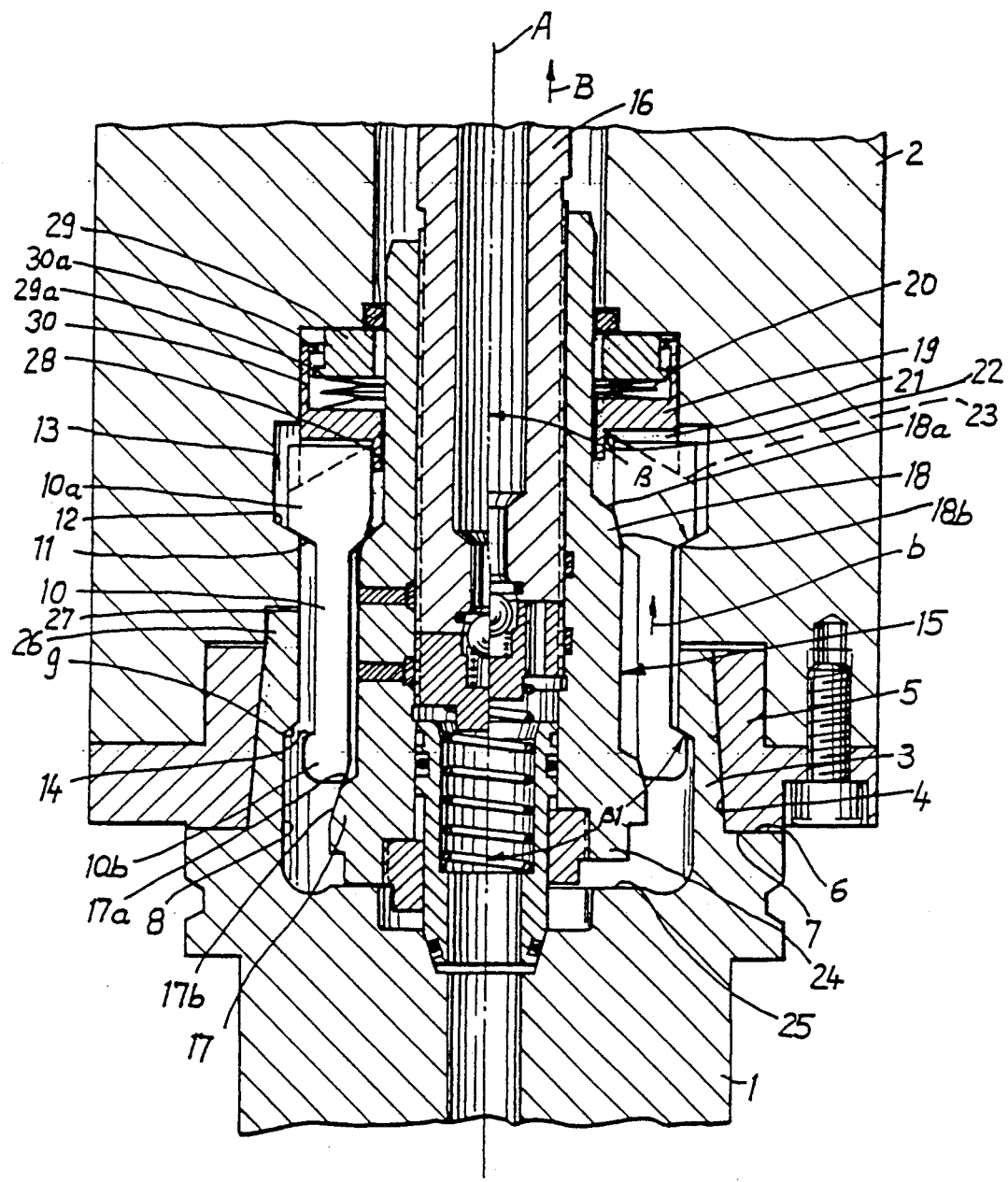
FIG. 1 is an axial section of the chuck, on the right in the clamped position, on the left in the released position.

In the drawings, 1 denotes a first machine part which is to be connected to the second machine part 2 by the chuck. For instance, the first machine part 1 can be a tool and the second machine part 2 a machine tool spindle. The chuck according to the invention is, however, also suitable for connecting other machine parts, for example, for connecting a milling head to a milling carriage, for connecting two machine tool benches to each other, or for connecting holding fixtures for workpieces to machine tool benches or the like.

The first machine part 1 may comprise a conical or cylindrical centering attachment 3 by which it can be inserted in a correspondingly adapted holding bore 4 of a centering ring 5 rigidly connected to a second machine part 2. The type of centering between the two machine parts 1, 2 is of no essential importance for the present invention. The holding bore 4 can also be provided directly in the second machine part 2.

The attachment 3 is surrounded by a contact face 6 which extends perpendicularly to the attachment axis or central axis A of the chuck and which can be pressed against an end face 7 also extending perpendicularly to the central axis A and surrounding the holding bore 4. The hollow attachment 3 is provided with an annular groove 8 which comprises a groove flank 9 tapering conically towards the free end of the attachment. The groove flank 9 is formed by a cone surface.

Concentrically to the central axis A are arranged, at equal circumferential angular intervals, several clamping jaws, for example eight, which extend essentially parallel to the central axis. At the first end 10a of each clamping jaw 10 is provided a clamping surface 11 formed by a conical surface section. This clamping surface 11 is supported on a groove flank 12 of an annular groove 13 provided in the second machine part 2. The annular groove 13 and the groove flank 12 are appropriately arranged directly in the second machine part 2. The groove flank 12 is a cone surface and inclined at the same angle $\beta$ to the central axis A as the clamping surface 11. The second end 10b of each clamping jaw is provided with an oppositely directed clamping surface 14 which is also formed by a conical surface section and which is inclined to the central axis A at an angle $\beta 1$ which corresponds to the angle of inclination of the groove flank 9 to the central axis A. The angles $\beta$ and $\beta 1$ are appropriately of equal size, but if necessary they can be different.

Radially within the clamping jaws 10 is provided a clamping sleeve 15 which is rigidly bolted to a control rod 16. The clamping sleeve 15 comprises a clamping cone 17 in the region of the second ends 10b of the clamping jaws. Another clamping cone 18 is provided in the region of the first ends 10a of the clamping jaws 10. Each of the clamping cones comprises two conical surface sections 17a, 17b or 18a, 18b which are inclined at different angles to the central axis A and of which the surface sections 17b, 18b respectively closer to the end face 7 form a smaller angle with the central axis A than the other surface sections 17a, 18a which are respectively further away.

Adjacent to the first ends 10a of the clamping jaws is provided a compression ring 19 which is spring-loaded in the axial direction and which is loaded for example by the cup springs 20. The compression ring 19 comprises a number of radial projections 21 corresponding to the number of clamping jaws, each of which projections is provided with an oblique surface 22. The projections 21 engage in mating relationship in corresponding guide grooves provided in the first ends 10a. In this way, the clamping jaws 10 are guided in a radial direction and held apart in a circumferential direction. At the bottom of each groove is provided an oblique surface 23 cooperating with the oblique surface 22 of the projection 21. If occasion arises, the arrangement could be reversed, namely, at the first ends 10a of the clamping jaws 10 is provided in each case a guide rib which engages in a radial guide slot of the compression ring 19.

If the centering attachment 3 is of conical design, appropriately at the free end of the clamping sleeve adjoining the first clamping cone 17 is provided an axial extension 24 which for release of the first machine part 1 cooperates with an ejector surface provided on the latter.

Furthermore, at the free end of the attachment 3 of the first machine part 1 are provided several axially projecting driver pins 26 which engage in corresponding driver recesses 27 in the second machine part 2. These driver pins 26 and driver recesses 27 are provided for transmission of torque, as far as this is not transmitted by frictional locking of the surfaces pressed against each other, in particular the contact face 6 and the end face 7 of the two machine parts 1, 2. The attachment 3 could if necessary also be provided with driver recesses in which engage driver blocks connected to the second machine part 2.

The mode of operation of the new chuck is as follows:

For connection of the two machine parts 1, 2, machine part 1 is inserted with its centering attachment 3 in the holding bore 4 while the chuck is released, as shown in FIG. 1 on the left. Then the control rod 16 according to FIG. 1 is displaced upwards and takes the clamping sleeve 15 with it. As a result the clamping jaws 10, which are at first supported on surface sections 17a and 18a, are displaced radially outwards a relatively long way with a small axial movement of the control rod 16, each clamping jaw 10 moving outwards parallel to itself and parallel to the central axis A. During further upward movement of the control rod 16, finally, surface sections 17b and 18b come into contact with the ends 10a and 10b of the clamping jaws. As these surface sections 17b and 18b are inclined at a smaller angle to the central axis A, the clamping jaws 10 are now forced radially outwards with great force. During radially outward displacement of the clamping jaws 10, the clamping surfaces 14 provided at the lower ends 10a abut against the groove flank 9. The radially outwardly moving clamping surface 14 acts on the groove flank 9 like a wedge and forces the attachment 3 upwards as in FIG. 1. As a result the contact face 6 is pressed in an axial direction firmly against the end face 7. As the clamping jaws are also supported by their first ends 10a via inclined clamping surfaces 11 on the conical groove flank 12, each clamping jaw 10 during its radial movement also moves axially in direction B upwards. Due to this movement of the clamping jaws 10 directed inwards with respect to machine part 2, greater axial tolerances can be compensated. During the whole clamping process, the angular position of the clamping jaws 10 in relation to the central axis does not change, so that the clamping surfaces 11 and 14 permanently have surface contact with the associated groove flanks 12 and 9 respectively. The contact pressure and wear are kept low as a result.

To release the chuck, the control rod 16 is forced downwards against the direction of arrow B. The spring-loaded compression ring 19 acts via the oblique surfaces 22, 23 on the upper ends 10a of the clamping jaws 10 and forces them radially inwards. At the end of the stroke of the clamping sleeve 15, its extension 24 strikes the ejector surface 25 and forces machine part 1 away from machine part 2. As a result the conical attachment 3 is released from the holding bore 4.

Figure 2:
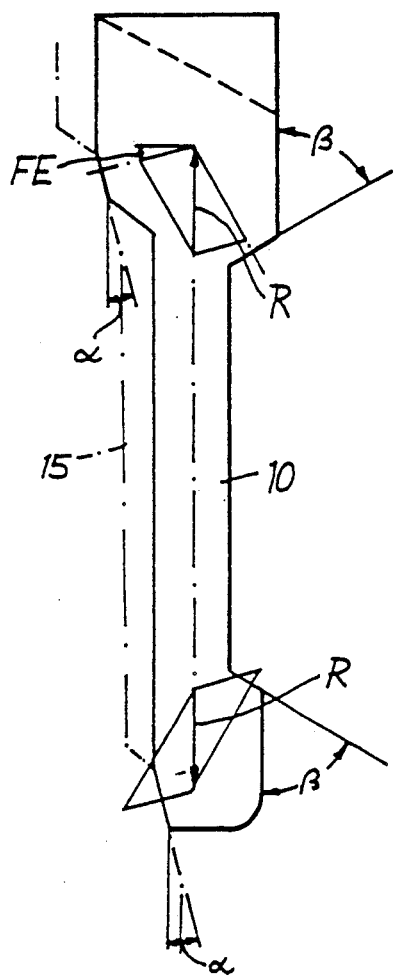
FIGS. 2 and 3 respectively illustrate one of the clamping jaws with different angular arrangements of the clamping surfaces.
Figure 3:
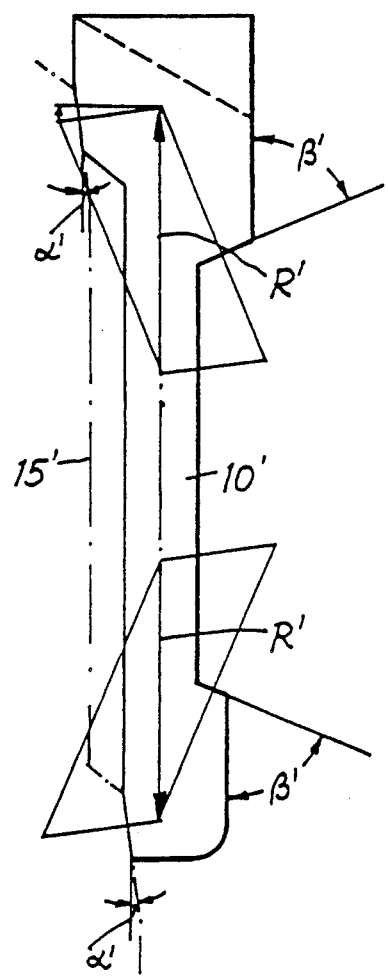

In FIGS. 2 and 3 is shown the trend of forces at a clamping jaw 10 or 10' with angles of different size $\alpha$ and $\beta$ or $\alpha'$ and $\beta'$. This is intended to show that the axially directed resultant forces R and R' can easily be varied and adapted to the respective requirements. If, instead of the angle $\beta$ shown in FIG. 2, a larger angle $\beta'$ is selected and/or the angle $\alpha$ is reduced to $\alpha'$, then with an equal axial force FE acting on the clamping sleeve 15, in the practical example of the clamping jaw 10' shown in FIG. 3, there is a resultant force R' in an axial direction acting as a clamping force, which is many times greater than the corresponding resultant force R with the clamping jaw 10 as in FIG. 2.

Appropriately, the compression ring comprises, on its side facing towards the first ends 10a, along its inside diameter, a cylindrical collar 28 which projects towards the first ends 10a and which in the released position of the chuck serves as a radial stop for the clamping jaws 10.

Furthermore, advantageously between the compression springs 20 which act on the compression ring 19, and the machine part 2 is disposed a counter-ring. The compression ring is furthermore provided with a sleeve 30 surrounding the counter-ring 29. On the sleeve 30 is disposed a shoulder 30a projecting radially inwards, and on the counter-ring 29 a shoulder 29a projecting radially outwards. The two shoulders 29a, 30a slightly overlap radially, so that during assembly it is only with great force that the counter-ring 29 can be pressed by its shoulder 29a axially through the shoulder 30a of the sleeve 30. The two shoulders 29a and 30a define the stroke of the two rings 19 and 29 in an axial direction and hold the two rings 19, 29 as well as the cup springs 20 together in an assembly unit. If required, the arrangement can be reversed, i.e. the sleeve disposed on the counter-ring.

We claim:

1. In a chuck for releasably axially clamping first and second machine parts along a central clamping axis, said chuck including one of a conical and a cylindrical hollow centering attachment provided on the first machine part, means for defining an axially facing contact surface surrounding said centering attachment and extending perpendicularly to said central clamping axis, means for defining an annular groove on the inside of said centering attachment which includes a groove flank tapering conically radially inwardly towards a free end of said centering attachment, means for defining a holding bore in the second machine part adapted to axially receive said centering attachment, means for defining on the second machine part an axially facing end face which radially surrounds said holding bore and extends perpendicularly to said central clamping axis and against which said contact face is pressable, means for defining a further annular groove in said holding bore which includes a further groove flank, several clamping jaws arranged substantially parallel to said central clamping axis in said holding bore of the second machine part, and means for yieldably supporting each said jaw at a first end thereof against said further groove flank of said further annular groove, a clamping sleeve which is axially movable in said holding bore of the second machine part and arranged radially within said clamping jaws and which includes clamping cone means engagable with respective second ends of said clamping jaws for moving said second ends of the clamping jaws radially outward against said groove flank of said centering attachment when said clamping sleeve moves axially, the improvement comprising: additional clamping cone means provided on said clamping sleeve and engagable with said first ends of said clamping jaws for, during axial movement of said clamping sleeve and in cooperation with said first-mentioned clamping cone means, moving said clamping jaws radially outward in mutually parallel relationship when said axial movement of said clamping sleeve occurs in a first direction and permitting said jaws to move radially inward in mutually parallel relationship when said axial movement of said clamping sleeve occurs in a second direction, said clamping jaws including at both said first and second ends thereof means for defining clamping surfaces respectively adapted to engage the associated said groove flank, each said clamping surface having an angular orientation relative to said central clamping axis and said associated groove flank which permits continuous surface contact between each said clamping surface and said associated groove flank.

2. A chuck according to claim 1, wherein said further groove flank in the second machine part tapers conically towards said end face.

3. A chuck according to claim 1, wherein each said clamping cone means includes means defining two conical surface sections which are inclined at respectively different angles to said central clamping axis respective said conical surface sections of each said clamping cone means which are closer to said end face forming a smaller angle with said central clamping axis than the other said conical surface sections which are respectively further away from said end face.

4. A chuck according to claim 1, wherein said yieldable support means includes a spring-loaded compression ring provided adjacent said first ends of said clamping jaws, said compression ring being spring-loaded in the axial direction and having, on a side thereof facing toward said first ends, means for defining first control surfaces, said clamping jaws having means for defining second control surfaces at said first ends, said first and second control surfaces being cooperable to disengage said second ends of said clamping jaws, in a released position of said chuck, from said groove flank of the first machine part.

5. A chuck according to claim 4, wherein said control surfaces are oblique surfaces inclined relative to said central clamping axis.

6. A chuck according to claim 4, wherein said first control surface defining means includes said compression ring having, on said side facing toward said first ends a number of radially extending projections corresponding to the number of said clamping jaws, wherein said second control surface defining means includes means for defining a guide groove in each of said first ends, wherein each said projection is engaged in mating relationship in a respective said guide groove, wherein a bottom surface of each said guide groove forms one said second control surface and wherein each said projection defines one said first control surface.

7. A chuck according to claim 4, wherein said first control surface defining means includes said compression ring having, on said side facing toward said first ends of said clamping jaws, means defining a number of radial guide slots corresponding to the number of said clamping jaws, and wherein said second control surface defining means includes each said clamping jaw having a guide rib at said first end thereof, said guide ribs being respectively engaged in said guide slots.

8. A chuck according to claim 1, wherein said further annular groove is formed directly in the second machine part.

9. A chuck according to claim 1, wherein a axial extension is provided at a free end of said clamping sleeve adjoining said first-mentioned clamping cone means, the first machine part having means for defining an ejector surface with which said axial extension is cooperable for releasing the first machine part.

10. A chuck according to claim 1, wherein, at said free end of said centering attachment of the first machine part, several axially projecting driver pins are provided, and wherein the second machine part includes means for defining driver recesses, said driver pins being engaged in said driver recesses.

11. A chuck according to claim 4, wherein said compression ring includes, on said side thereof facing toward said first ends and along its inside diameter, a cylindrical collar which projects towards said first ends and which in said released position of said chuck serves as a radially inner stop for said clamping jaws.

12. A chuck according to claim 4, wherein said yieldable support means includes compression springs by which said compression ring is spring-loaded, and wherein a counter-ring is disposed axially between said compression springs and the second machine part, one of said compression ring and said counter-ring being provided with a sleeve surrounding the other of said rings, said sleeve including a radially inwardly projecting shoulder, the other of said rings having a radially outwardly projecting shoulder, and wherein said shoulders overlap radially and coact to hold said two rings as well as said compression springs together in an assembly unit.

* * * * *